Dec. 10, 1968          HUGH L. DRYDEN          3,415,556
       DEPUTY ADMINISTRATOR OF THE NATIONAL
       AERONAUTICS AND SPACE ADMINISTRATION
       CERAMIC-TO-METAL SEAL AND METHOD OF MAKING SAME
Filed Dec. 13, 1963                       2 Sheets-Sheet 1

INVENTOR.
LEONARD REED

BY

*G. W. O'Brien*
*Howard B. Scheckman*
ATTORNEY

Dec. 10, 1968

HUGH L. DRYDEN
DEPUTY ADMINISTRATOR OF THE NATIONAL
AERONAUTICS AND SPACE ADMINISTRATION
CERAMIC-TO-METAL SEAL AND METHOD OF MAKING SAME 3,415,556

Filed Dec. 13, 1963

INVENTOR.
LEONARD REED

BY

ATTORNEY

United States Patent Office 3,415,556
Patented Dec. 10, 1968

3,415,556
CERAMIC-TO-METAL SEAL AND METHOD
OF MAKING SAME
Hugh L. Dryden, Deputy Administrator of the National Aeronautics and Space Administration, with respect to an invention of Leonard Reed, assignor, by mesne assignments, to Varian Associates, a corporation of California
Filed Dec. 13, 1963, Ser. No. 330,211
22 Claims. (Cl. 287—189.365)

The invention described herein was made in the performance of work under a NASA contract and is subject to the provisions of Section 305 of the National Aeronatutics and Space Act of 1958, Public Law 85–568 (72 Stat. 435; 42 U.S.C. 2457).

This invention relates to composite metal and ceramic structures, and is particularly directed to such structures having vacuum tight ceramic-to-metal seals impervious to gaseous and liquid mercury at elevated temperatures and to a method of making same.

Composite metal and ceramic structures are widely employed, however, certain applications thereof impose strict structural requirements. In the formation of such conventional structures of this type, a variety of methods of bonding ceramic-to-metal are employed. In some applications, however, the desired use of composite metal and ceramic structures has been precluded because the conventional methods of forming ceramic-to-metal seals is inadequate. Damage to the seal during fabrication or deterioration thereof in use may result from the conditions to which the seal is subjected. The seals, for example, break down when attacked by various high temperature liquid metals, the liquid metal permeating the seal area and causing deterioration thereof. For example, mercury at the temperature of about 500° C. damages conventional ceramic-to-metal seals. Environmental conditions of this type prevail in many nuclear reactor heat exchange arrangements, mercury switching tubes, etc. and, accordingly, although composite metal and ceramic structures might be beneficially employed in such arrangements, their use has been limited by the inability of the seals to withstand the environment. Similarly, in the provision of a thin composite ceramic and metal seal assembly for use in a high temperature liquid mercury environment, difficulty has been encountered in providing bonded ceramic-to-metal seals which will not break down. In addition, where the ceramic parts of the structure are thin, such as in the latter instance, it is desirable that the structure be strengthened or reinforced, in addition to having hermetically sealed metal-to-ceramic seals where are impervious to high temperature liquid metals. The present invention overcomes these and other difficulties in the prior art.

It is, therefore, an object of the present invention to provide composite ceramic-metal structures having vacuum tight ceramic-to-metal seals which are impervious to high temperature liquid and gaseous metals, and the like.

Another object of the invention is to provide a method of forming a ceramic-to-metal hermetic seal between a metal part and a ceramic part.

Still another object of the invention is the provision of a method of forming a hermetic seal of the class described which does not entail high temperatures in the formation thereof which would tend to create thermal and mechanical stresses in the seal.

Another object of this invention is to provide a ceramic-to-metal seal that is impervious to liquid and gaseous mercury at elevated temperatures together with the method of obtaining such a seal.

It is yet another and more specific object of the invention to provide a composite metal and ceramic assembly including a first and second annular metallic body with a thin reinforced annular ceramic disk therebetween, such assembly having vacuum tight ceramic-to-metal seals.

A further object of the invention is the provision of a method of making a ceramic-to-metal seal of the class described.

These and other objects of the present invention are accomplished by providing a ceramic-to-metal seal which includes a ceramic body having a metalized coating thereon. A layer of metal is secured to the metallized coating and a metal body is secured to a portion of the metal layered metalized coating. The joint between the metal body and the metal layered metalized coating is covered with a deposited metallic coating such that the deposited coating bridges an exposed portion of the metalized portion and an adjacent portion of the metal body to hermetically seal the joint therebetween.

In accordance with another feature of the present invention, a ceramic-to-metal seal impervious to liquid and gaseous corrosive atmospheres is provided by a ceramic body having a titanium-manganese-molybdenum metalized layer thereon. A layer of nickel covers a portion of the metalized layer and a metal body is brazed to the nickel layered metalized coating with a copper-silver brazing alloy to provide a vacuum tight seal between the ceramic body and the metal body. A metallic coating bridges an exposed portion of the metalizing and an adjacent portion of the metal body to cover at least a portion of the vacuum tight seal.

In accordance with another feature of the present invention, a ceramic-to-metal seal impervious to liquid and gaseous mercury at elevated temperatures is provided by coating a ceramic body with a titanium-manganese-molybdenum metalized layer and then covering the metalized coating with a layer of iron. A metal body is brazed to a portion of the iron layered metalized coating with a nickel base brazing alloy to form a vacuum tight seal between the ceramic body and the metal body.

In accordance with still another feature of this invention, a method of making a ceramic-to-metal seal is disclosed that includes coating at least a portion of the surface of a ceramic body with a metalized layer, placing at least a portion of the surface of a metal member adjacent a portion of said metalized layer to form a ceramic-metal assembly, and coating a metallic layer from an exposed portion of the metalized layer to an adjacent portion of the metal member to provide a hermetic seal therebetween.

In accordance with a further feature of the present invention, a method of forming ceramic-to-metal seals which are impervious to liquid and gaseous mercury at elevated temperatures is provided that includes the steps of coating at least a portion of the surface of a ceramic body with a metalized layer which includes manganese and molybdenum, coating a portion of the metalized layer with a layer of nickel, brazing a metal body to the nickel layered metalized coating, placing the resulting ceramic-metal assembly in a substantially silica free, heated, ferrous fluoborate electroplating bath which has an inert gas atmosphere over the surface thereof and which includes ferrous fluoborate concentrate and sodium chloride, and electroforming a layer of iron from an exposed portion of the metalized coating to an adjacent portion of said metal body.

In accordance with another feature of the present invention, a method of forming ceramic-to-metal seals which are impervious to liquid and gaseous mercury at elevated temperatures is provided and includes the steps of coating at least a portion of the surface of a ceramic body with a sintered metalized layer which includes manganese and molybdenum, coating said metalized layer with a sintered layer of iron, and brazing a metal body to said iron layered metalized coating with a nickel based brazing alloy to form a vacuum tight ceramic-to-metal seal between the ceramic body and the metal body.

This invention as well as other objects, features and advantages thereof will be readily apparent from consideration of the following detailed description relating to the annexed drawings in which.

Vacuum tight ceramic-to-metal seal techniques developed for present day vacuum tubes are being extended to many other products and environments in which elevated temperatures and/or corrosive atmospheres are encountered. For example, the utilization of liquid metals and their vapors in the primary and secondary loops of nuclear power units present the problem of protecting the copper stator winding from the atmosphere of liquid and gaseous mercury at elevated temperatures in which the rotor rotates. Ceramic-metal shield assemblies located between the rotor and stator have been devised to protect the stator winding. The most feasible location for these shield assemblies is the axial or radial gap between the rotor and stator and take the form of "bore seals" for cylindrical geometries and diaphragms for radial geometries. Since ceramic materials have substantially no eddy current losses, the flux linking the rotor and stator is caused to pass through the ceramic portion of the assembly.

Figure 1:
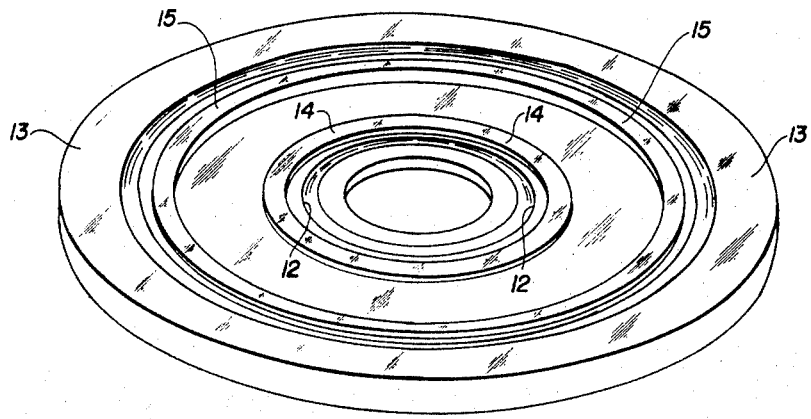
FIGURE 1 is a schematic illustration of a typical ceramic-metal assembly.
Figure 2:
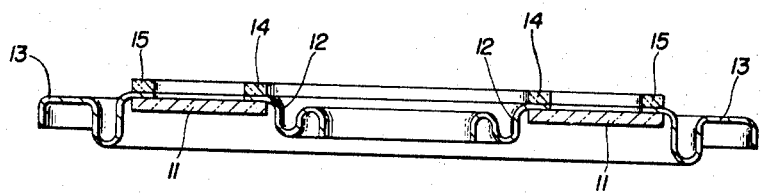
FIGURE 2 illustrates a cross-sectional view of the device shown in FIGURE 1.

Referring now to the drawings, wherein like reference characters designate like or corresponding parts throughout the several views, there is illustrated in schematic form in FIGURES 1 and 2 a typical diaphragm ceramic-metal assembly which includes an annular ceramic disk 11 which may be formed from a suitable ceramic, such as beryllia or a high alumina ceramic (one containing more than 85% alumina). Since the flux lines must pass through the ceramic disk 11, the ceramic is made as thin as possible. For example, one embodiment utilized a 0.03 inch thick ceramic disk 11.

Brazed or otherwise secured to the inner and outer portions of the ceramic disk 11 are a first and second metal body 12 and 13, respectively. The first metal body or hub 12 is formed from a suitable metal, such as Kovar or columbium, and is convoluted as is illustrated in FIGURE 2. A second metal body or rim 13 is formed from a suitable metal, such as Kovar or columbium, and is also convoluted. The first and second metal members 12 and 13 are fabricated from sheet metal having a thickness ranging from .010 inch to .030 inch depending on the size of the ceramic-metal assembly fabricated.

Secured to the surfaces of the first and second metal members 12 and 13 opposite the ceramic disk 11 are two annular back up rings 14 and 15, respectively. These back up rings 14 and 15 protect the ceramic-metal assembly from destructive and deforming strains when the metal members 12 and 13 are brazed or otherwise secured to the annular ceramic disk 11.

The device of FIGURE 2 was placed between a rotor and a stator such that the rotor was located below the ceramic disk 11 and the stator was located above the ceramic disk 11. Since the corrosive atmosphere, such as liquid and gaseous mercury at an elevated temperature of about 500° C. was located in the rotor portion of the electric generator assembly (not shown), it was only necessary to make that portion of the seals of the ceramic disk 11 to the first and second metal members 12 and 13 facing the rotor portion of the assembly impervious to the corrosive atmosphere. Accordingly, the sealing or bonding of the annular back up rings 14 and 15 to the first and second metal members 12 and 13, respectively did not need to be impervious to the corrosive atmosphere.

Figure 3:
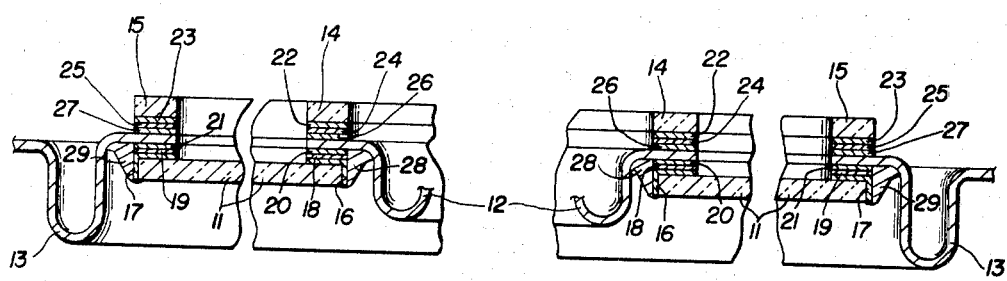
FIGURE 3 illustrates in enlarged schematic form a ceramic-to-metal seal in accordance with the present invention which may be utilized to bond the ceramic-metal assembly illustrated in FIGURES 1 and 2.

An enlarged schematic illustration of the novel ceramic-to-metal seal constituting one embodiment of this invention which was utilized to construct the ceramic-metal assembly shown in FIGURE 2 is illustrated in FIGURE 3. The ceramic-to-metal seal shown in FIGURE 3 was obtained by forming metalized layers 16 and 17 on the inner and outer portions, respectively, of the annular ceramic disk 11 as shown in FIGURE 3. The metalized layers 16 and 17 are preferably formed by intimately mixing powdered manganese, titanium and molybdenum by any suitable means, such as by ball milling, in a suitable carrier such as acetone, methyl amyl acetate, or mixtures thereof, preferably with a suitable binding agent such as nitrocellulose. The resulting metalizing paint composition is brushed, sprayed, printed or otherwise applied to the desired inner and outer portions of the ceramic disk. The coated ceramic disk is then fired in an atmosphere furnace to sinter the metalized coating onto the ceramic. A reducing atmosphere is desirable and commercial hydrogen has been found to be satisfactory for this purpose. The temperature of the furnace should be at least as high as the sintering temperature of the metalizing paint composition and below the softening point of the ceramic disk 11. For example, excellent results have been obtained by firing the coated ceramic 11 at a temperature of about 1425° C. for about 30 minutes.

The relative percentages of the titanium, manganese and molybdenum in the dry powder mixture are not critical within certain limits. For example, the metalizing paint composition may contain 1 to 25% by weight titanium, 40 to 10% by weight of manganese and a major proportion by weight of molybdenum.

After the annular ceramic disk has been metalized in a manner described hereinabove, layers 18 and 19 of a suitable metal, such as nickel, are applied to portions of the inner and outer metalized areas 16 and 17, respectively as illustrated in FIGURE 3. The nickel layers 18 and 19 are preferably coated on the metalized layers 16 and 17 by electroplating followed by sintering in a hydrogen atmosphere at about 1000° C.

Once the nickel layers 18 and 19 are applied to the metalized areas 16 and 17, the first and second metal members 12 and 13 are positioned adjacent the nickel layered metalized areas 16 and 17, respectively. Sandwiched between the first and second metal bodies 12 and 13 and the nickel layered metalized areas 16 and 17 are copper-silver brazing rings 20 and 21, respectively. The entire assembly is then brazed at about 810° C. to form vacuum tight seals between the first and second metal bodies 12 and 13 and the ceramic disk 11.

At the same time that the first and second metal bodies 12 and 13 are brazed to the annular ceramic disk 11, the annular back up rings 14 and 15 are also brazed to the first and second metal bodies 12 and 13, respectively. This is accomplished by applying a metalized layer 22 and 23 to the back up rings 14 and 15, respectively, in a manner as discussed hereinabove in conjunction with the ceramic disk 11. A layer 24 and 25 of a suitable metal, such as nickel, is also applied to the metalized areas 22 and 23 as discussed hereinabove. Copper-silver brazing rings 26 and 27 are then sandwiched between the nickel layered metalized ceramic back up rings 14 and 15 and the metal members 12 and 13, respectively, and brazed thereto simultaneously with the brazing of the metal members 12 and 13 to the annular ceramic disk 11. The annular back up rings 14 and 15 eliminate the destructive strains due to the brazing temperatures which otherwise would tend to deform and warp the resulting ceramic-metal assembly.

Although the Kovar or columbium members 12 and 13 and the annular disk 11 of alumina or beryllia ceramic are impervious to corrosive atmospheres, such as gaseous and liquid mercury at elevated temperatures, the vacuum tight ceramic metal seals therebetween are attacked by mercury and other corrosive atmospheres and deteriorate in a very short time. In order to protect the vacuum tight ceramic-to-metal seals, layers 28 and 29 of a suitable metal, such as iron, extend from exposed portions of the metalized layers 16 and 17 to an adjacent portion of the first and second metal members 12 and 13, respectively. The layers of iron 28 and 29 are impervious to liquid and gaseous corrosive atmospheres, such as mercury at elevated temperatures, and therefore protect the vacuum tight seals between the annular ceramic disk 11 and the metal body members 12 and 13 by forming a hermetic seal therebetween.

The iron barrier layers 28 and 29 are formed by any suitable means, such as by placing the ceramic-metal assembly in a ferrous fluoborate electroplating bath and electrodepositing the iron layers 28 and 29. A typical electroplating bath comprises about 45% by weight of ferrous fluoborate concentrate, about 1% by weight of sodium chloride, and about 54% by weight of water. A typical ferrous fluoborate concentrate had the following analysis: 41% by weight of iron fluoborate, about 10% by weight of iron, about .7% by weight of fluoboric acid, and about 3% by weight of boric acid.

The electroplating bath was prepared by placing two-thirds of the required amount of water in a suitable tank or container and then the required amount of sodium chloride was added. When the sodium chloride dissolved, the ferrous fluoborate concentrate was measured or weighed and placed directly into the tank. Water was then added to bring the bath to the required volume. The electroplating bath was then adjusted to the desired operating pH. The pH of the electroplating bath may be raised by adding iron filings or lowered by adding plating-grade fluoboric acid. The resulting bath was then continuously filtered through a silica free filtering system to remove solid and other contaminants. Because of the high fluoboric acid content of the bath, it was found desirable to keep the bath silica free. Accordingly, a steel tank lined with polyvinyl chloride was utilized to contain the bath solution. Glassware was also avoided thus eliminating the use of a pH meter for controlling the bath pH which was determined by a colorimeter test.

The electroplating bath was maintained under the following conditions:

| | |
|---|---|
| Baumé at 80° F. _____degrees__ | 19–21 |
| pH (colorimetric) _____ | 3.0–3.7 |
| Temperature _____° F__ | 150 |
| Average tank voltage _____volts__ | 2–6 |
| Average cathode current density__amps./sq. ft__ | 75 |
| Anode-cathode ratio _____ | 1 to 1 |

It was found desirable that the bath contain a small amount of ferric iron of about 1 to 3 grams per liter of electroplating bath solution. Excess ferric iron was removed by low current density electrolysis or by treating the bath with iron filings and sufficient fluoboric acid to maintain the pH of the bath in the range recommended. In order to prevent oxidation of ferrous iron to ferric iron, an inert gas atmosphere, such as argon, was maintained over the surface of the bath.

The iron barrier layers 28 and 29 are applied to the vacuum tight seals by first masking off the metal areas of the ceramic-metal assembly which are not to receive the iron barrier layers 28 and 29 with microstop lacquer which had been baked overnight at 200° F. The ceramic-metal assembly is then placed in the electroplating bath and appropriately connected to a source of D.C. potential current such that the seal areas function as an electroplating cathode. An iron bar is also placed in the bath and appropriately coupled to a source of D.C. potential such that it acts as an anode. In order to prevent pitting of the electrodeposited iron layers 28 and 29 due to hydrogen bubbling, the ceramic-metal assembly is rotated during the electroplating operation. Pitting is also reduced by ultrasonically agitating the bath with a suitable device, such as a Sonogen LG 300 ultrasonic generator manufactured by Branson Instruments. Pitting is further reduced by periodically reversing the electroplating current. For example, iron was allowed to deposit over the seal areas for about 5 seconds, after which the electroplating current would be reversed, thereby deplating the seal area for a period of approximately 2 seconds. The optimum current density was found to be about 75 amps per square foot with higher current densities resulting in a rough deposit and lower current densities resulting in bare spots. As illustrated in FIGURE 3, the resulting iron barrier layers 28 and 29 extend from an exposed portion of the metalized areas 16 and 17 and bridge across the ceramic-to-metal seal areas to an adjacent portion of the first and second metal bodies 12 and 13, respectively. If desired, the iron barrier layers 28 and 29 may be further plated with chrome (not shown) to prevent iron oxidation.

In accordance with another embodiment of the present invention, it was discovered that if the ceramic-to-metal seals illustrated in FIGURE 3 were fabricated by applying a sintered layer of iron over the metalized areas 16 and 17, instead of the nickel layers 18 and 19, and if a nickel based brazing alloy were used, such as Nicrobraz 130, in place of the copper-silver brazing rings 20 and 21, the resulting ceramic-to-metal seal would be vacuum tight and also resistant to gaseous and liquid mercury vapors at elevated temperatures without the necessity of utilizing the iron barrier layers 28 and 29. In fabricating this type of seal, the layer of iron was applied to the metalized areas 16 and 17 by the plating technique discussed above followed by sintering in a hydrogen atmosphere at about 850° C. Also, unlike the copper-silver brazed seal, the iron layer may cover the entire metalized surface inasmuch as it is immaterial whether the iron barrier layers 28 and 29 extend from an exposed portion of the metalizing or from an exposed portion of the iron layered metalized surface. Such seals showed no deterioration due to mercury liquids or gases at elevated temperatures over an exposure period of several hundred hours. If prolonged exposure to such vapors over a much longer period of time would deteriorate these seals is unknown at the present time. Accordingly, for long term use of metal-ceramic assemblies utilizing such a seal, it is recommended that the iron barrier layers 28 and 29 shown in FIGURE 3 be used in conjunction with the seal utilizing the nickel based brazing material and the iron covered metalized layer.

Figure 4:
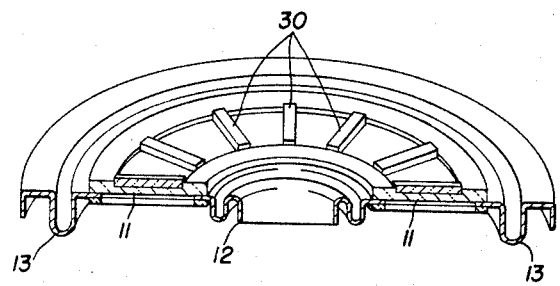
FIGURE 4 is a schematic illustration of a modification of the ceramic-metal assembly shown in FIGURES 1 and 2.

Referring now to FIGURE 4, there is illustrated a modification of the device illustrated in FIGURES 1 and 2 wherein the thin annular ceramic disk is mechanically strengthened by placing a plurality of circumferentially spaced struts 30 in contact with the flat surface of the ceramic disk 11 such that they extend radially between the first and second metal members 12 and 13. The struts 30 are secured to the flat surface of the annular ceramic disk 11 by metalizing the surface of the disk 11 beneath the struts and the bottom surface of the struts with the metalizing composition described hereinabove in detail and brazing the metalized struts to the metalized surface portion of the ceramic disk with a suitable brazing metal, such as copper.

Conventional brazing techniques, such as those described hereinabove in detail in connection with FIGURE 3, require a brazing temperature at which there is a relatively wide mismatch in the thermal expansion and contraction rates of the ceramic disk 11 and the first and second metal members 12 and 13 which impose undesirable stresses on the resulting ceramic-metal assembly. It was discovered that a suitable bond, impervious to liquid and gaseous mercury at elevated temperatures, could be obtained between a ceramic body and one or more metallic bodies by simply electroforming a layer of iron over the ceramic-metal jointure.

Figure 5:
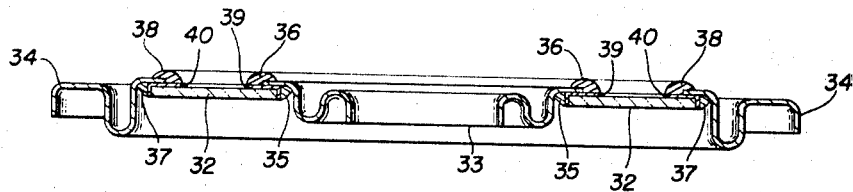
FIGURE 5 illustrates in enlarged schematic form another ceramic-to-metal seal in accordance with the present invention which may be utilized to bond the ceramic-metal assembly shown in FIGURES 1 and 2.

Referring now to FIGURE 5, which illustrates in schematic form a cross-sectional view of such a metal-ceramic assembly, it is shown that the annular ceramic disk 32 has its outer and inner portions metalized, preferably with a molybdenum-manganese-titanium metalizing paint in a manner discussed hereinabove in detail. After the annular ceramic disk is metalized, the first and second metal members 33 and 34 are positioned adjacent the metalized areas 39 and 40, respectively, such that they overlap at least a portion of the metalized surfaces 39 and 40. The metal members 33 and 34 are then secured to the annular ceramic disk 32 by any suitable means, such as clamping, brazing, etc. The resulting ceramic-metal assembly is then placed in a ferrous fluoborate electroplating bath as described hereinabove in detail and layers of iron 35 and 36 are electrodeposited so that they bridge an exposed portion of the metalized layer 39 to an adjacent surface of the metal body 33. Iron layers 37 and 38 are electrodeposited so that they bridge an exposed portion of the metalized surface 40 to an adjacent surface of the metal body 34. The iron barrier layers 35, 36 and 37, 38 hermetically seal the metal members 33 and 34 to the annular ceramic disk 32 and are impervious to liquid and gaseous mercury at elevated temperatures.

What has been described are various ceramic-to-metal seals which are impervious to liquid and gaseous mercury at elevated temperatures and which may be utilized to fabricate various ceramic-metal assemblies which may be utilized in corrosive atmospheres. It is to be understood, of course, that the subject invention is not limited to the diaphragm type ceramic-metal assembly illustrated in FIGURES 1–5, for the teachings of the present invention may be utilized to fabricate various types of ceramic-metal assemblies. Also described herein and forming part of the present invention are the methods and processes for obtaining ceramic-to-metal seals impervious to liquid and gaseous mercury at elevated temperatures.

Obviously many modifications and variations of the present invention are possible in light of the above teachings.

What I claim is:

1. A ceramic-to-metal seal comprising a ceramic body having a metalized coating over at least a portion thereof, a metal body having at least a portion of its surface located adjacent to a portion of said metalized layer, and an electrodeposited coating of iron permanenty bridging an exposed portion of said metalized coating and an adjacent portion of said metal body to provide a hermetic seal therebetween that is impervious to liquid and gaseous mercury.

2. A ceramic-to-metal seal impervious to liquid and gaseous mercury comprising a ceramic body having a metalized coating thereon, a first layer of metal secured to a portion of said metalized coating, a metal body secured to the metal layered metalized coating, and an electrodeposited iron coating bridging an exposed portion of said metalized coating and an adjacent portion of said metal body to hermetically seal the joint therebetween.

3. A ceramic-to-metal seal impervious to liquid and gaseous mercury comprising a ceramic body having a metalized layer thereon, said metalized layer including at least 40% to 10% by weight of manganese and a major proportion by weight of molybdenum, a metal body adjacent a portion of said metalized layer, and an electrodeposited iron coating bridging an exposed portion of said metalized layer and an adjacent portion of said metal body to hermetically seal the joint therebetween.

4. A ceramic-to-metal seal impervious to liquid and gaseous mercury comprising a ceramic body having a metalized coating thereon, said metalized coating including at least manganese and molybdenum, a layer of metal secured to at least a portion of said metalized layer, a metal body brazed to said metal layered metalized coating, and an electrodeposited coating of iron bridging an exposed portion of said metalized coating and an adjacent portion of said metal body to hermetically seal the joint therebetween.

5. A ceramic-to-metal seal impervious to liquid and gaseous mercury comprising a ceramic body having a metalized coating thereon, said metalized coating including titanium, manganese and molybdenum, a layer of nickel secured to a portion of said metalized layer, a metal body having at least a portion of its surface brazed to said nickel layered metalized coating with a copper-silver brazing alloy to provide a vacuum tight seal between said ceramic body and said metal body, and an iron coating bonded to and permanently bridging an exposed portion of said metalized coating and an adjacent portion of said metal body to cover said vacuum tight seal.

6. A ceramic-metal assembly having ceramic-to-metal seals impervious to liquid and gaseous mercury at elevated temperatures comprising a thin flat annular ceramic body having annular metalized areas on the inner and outer portions thereof, a first annular convoluted metal member secured to a portion of said inner metalized area, a first coating of iron bridging an exposed portion of said inner metalized area and an adjacent portion of said first metal member to provide a hermetic seal therebetween, a second annular convoluted metal member secured to a portion of said outer metalized area, and a second coating of iron bridging an exposed portion of said outer metalized area and an adjacent portion of said second metal member to provide a hermetic seal therebetween.

7. The combination according to claim 6 further including a plurality of circumferentially spaced struts in contact with a flat surface of said ceramic body and extending radially between said first and second metal members.

8. A ceramic-metal assembly having ceramic-to-metal seals impervious to liquid and gaseous mercury at elevated temperatures comprising a thin flat annular ceramic body having annular metalized areas on the inner and outer portions thereof, said metalized areas including at least manganese and molybdenum, a layer of nickel secured to a portion of said inner and outer metalized areas, a first annular convoluted metal member having at least a portion of its surface brazed to said nickel layered inner metalized area with a copper-silver brazing alloy to form a vacuum tight seal between said first metal body and said nickel layered inner metalized area, a first coating of iron bonded to and permanently bridging an exposed portion of said inner metalized area and an adjacent portion of said first metal member to cover said vacuum tight seal, a second annular convoluted metal member having at least a portion of its surface brazed to a portion of said nickel layered outer metalized area with a copper-silver brazing alloy to form a vacuum tight seal therebetween, and a second coating of iron bonded to and permanently bridging an exposed portion of said outer metalized area and an adjacent portion of said second metal member to cover said vacuum tight seal therebetween.

9. A method of making a ceramic-to-metal seal that is impervious to liquid and gaseous mercury at elevated temperatures comprising the steps of coating at least a portion of the surface of a ceramic body with a metalized layer, placing at least a portion of the surface of a metal member adjacent a portion of said metalized layer to form a ceramic-metal assembly, and coating a layer of coating with a nickel base brazing alloy to form a vacuum tight seal between said ceramic body and said metal body and a coating of iron bonded to and permanently bridging an exposed portion of said metalized coating and an adjacent portion of said metal body to cover said vacuum tight seal.

22. A ceramic-metal assembly having ceramic-to-metal seals impervious to liquid and gaseous mercury at elevated temperatures comprising a thin flat annular ceramic disk having annular metalized areas on the inner and outer portions thereof, said metalized areas including at least manganese and molybdenum, a layer of iron covering said inner and outer metalized areas, first and second annular convoluted metal members having at least a portion of their surface brazed to said iron covered inner and outer metalized areas respectively with a nickel based brazing alloy to form vacuum tight seals therebetween, and a coating of iron bonded to and permanently covering said vacuum tight seals formed between said iron layered inner metalized area and said first metal member and between said iron layered outer metalized area and said second metal member.

References Cited

UNITED STATES PATENTS

| | | |
|---|---|---|
| 2,097,073 | 10/1937 | Long. |
| 2,451,340 | 10/1948 | Jernstedt. |
| 2,667,427 | 1/1954 | Nolte. |
| 2,745,800 | 4/1956 | Poor. |
| 2,798,577 | 7/1957 | LaForge. |
| 2,857,663 | 10/1958 | Beggs. |
| 2,859,372 | 11/1958 | Stangl. |
| 2,972,808 | 2/1961 | Littoy. |
| 3,023,492 | 4/1962 | Bristow. |
| 3,107,756 | 10/1963 | Gallet. |

MARION PARSONS, JR., *Primary Examiner.*

U.S. Cl. X.R.

277—235; 29—473.1